US009020663B2

(12) United States Patent
Smith et al.

(10) Patent No.: US 9,020,663 B2
(45) Date of Patent: Apr. 28, 2015

(54) INSTRUCTION VISUALIZATION SYSTEM (75) Inventors: Scott D. G. Smith, Issaquah, WA (US); Ronald Carl Provine, Bothell, WA (US); Michael Scott Kerstetter, Renton, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 13/438,146

(22) Filed: Apr. 3, 2012

(65) Prior Publication Data
US 2013/0261850 A1    Oct. 3, 2013

(51) Int. Cl.
*G01C 21/00*  (2006.01)
*G05D 1/02*  (2006.01)
*G08B 23/00*  (2006.01)
*G01C 23/00*  (2006.01)
*G08G 5/00*  (2006.01)

(52) U.S. Cl.
CPC ............ *G08G 5/0008* (2013.01); *G01C 23/005* (2013.01); *G08G 5/0013* (2013.01); *G08G 5/0021* (2013.01); *G08G 5/0039* (2013.01); *G08G 5/0052* (2013.01)

(58) Field of Classification Search
USPC .............. 701/2–3, 14, 24; 340/963, 971, 945, 340/967; 342/36; 704/235, 246
See application file for complete search history.

(56) References Cited

U.S. PATENT DOCUMENTS

| 5,420,582 | A | 5/1995 | Kubbat et al. |
| 5,920,321 | A | 7/1999 | Owen et al. |
| 6,289,277 | B1 | 9/2001 | Feyereisen et al. |
| 6,690,299 | B1 | 2/2004 | Suiter |
| 7,375,678 | B2 | 5/2008 | Feyereisen et al. |
| 2004/0033473 | A1* | 2/2004 | Cooke ............................. 434/45 |
| 2005/0203676 | A1 | 9/2005 | Sandell et al. |
| 2006/0022845 | A1* | 2/2006 | Fischer ......................... 340/945 |
| 2010/0027768 | A1* | 2/2010 | Foskett ...................... 379/88.14 |
| 2010/0030401 | A1 | 2/2010 | Rogers et al. |
| 2011/0102199 | A1* | 5/2011 | McCullough ................. 340/979 |
| 2011/0202206 | A1 | 8/2011 | Karthikeyan et al. |
| 2013/0093794 | A1* | 4/2013 | Dairman et al. .............. 345/672 |

FOREIGN PATENT DOCUMENTS

EP          2159545 A1    3/2010
WO      2011107956 A1    9/2011

OTHER PUBLICATIONS

Moldovan et al., "COGEX: A Logic Prover for Question Answering", Proceedings of HLT-NAACL 2003 Main Papers, May-Jun. 2003, pp. 87-93, Edmonton, Alberta, Canada.
Extended European Search Report, dated Mar. 11, 2014, regarding Application No. EP13162220.1, 10 pages.

* cited by examiner

*Primary Examiner* — Yonel Beaulieu
(74) *Attorney, Agent, or Firm* — Yee & Associates, P.C.

(57) ABSTRACT

A method and apparatus comprising an instruction analyzer. The instruction analyzer is configured to receive a movement instruction for an aircraft during movement of the aircraft. The instruction analyzer is further configured to generate a number of volumes of airspace defining a desired movement of the aircraft using the movement instruction during the movement of the aircraft.

18 Claims, 9 Drawing Sheets

INSTRUCTION VISUALIZATION SYSTEM

BACKGROUND INFORMATION

1. Field

The present disclosure relates generally to aircraft and, in particular, to managing information for operating aircraft. Still more particularly, the present disclosure relates to a method and apparatus for visualizing instructions for operating an aircraft.

2. Background

In operating an aircraft, a pilot performs many different tasks. For example, the pilot reviews displays of information about the flight of the aircraft. Additionally, the pilot also may perform planning or administrative tasks with respect to the current flight. Also, the pilot may receive flight instructions from an air traffic management authority, such as an air traffic control (ATC). These flight instructions may be clearances regarding where the aircraft may fly. The flight instructions may be received as verbal instructions, as text, or in other types of digital form from the air traffic management personnel. Instructions in digital form may include, for example, Controller Pilot Data Link Communications (CPDLC).

For example, a pilot receives verbal clearance from air traffic management personnel before landing. The air traffic management personnel may be part of air traffic control at an airport or other controlling authorities for the airspace in which the aircraft is operating.

Verbal instructions may also be received in other situations. For example, the pilot may encounter undesired conditions while landing the aircraft. These undesired conditions may include severe weather, other vehicles, and unfamiliar terrain. For example, the pilot may receive flight instructions in the form of verbal instructions for operating the aircraft in these undesired conditions. These verbal instructions may be received in response to a request to change the operation of the aircraft or received on the initiative of the air traffic management personnel. The operation may be, for example, a change in the flight path of the aircraft, a change in airspeed, and other operations.

With reference again to the example in which a pilot receives a verbal clearance for landing, the pilot must take into account other factors as part of the landing process. For example, the pilot must take into account airspace operational regulations for the specific airspace in which the pilot is operating the aircraft.

Additionally, the pilot often needs to interpret this information quickly, depending on the current operation of the aircraft. The identification of allowable aircraft maneuver limits may require calculations and may take more time or be more difficult than desired.

Further, after the pilot identifies the allowable aircraft maneuver limits, the pilot inputs this data in the controls to operate the aircraft at the desired clearance as provided by air traffic management personnel. Performing this process may take more time than desired.

In addition, rapid changes in conditions at an airport may require the pilot to quickly operate the aircraft to avoid undesired effects. These operations may not occur as quickly as desired if the pilot processes written instructions, verbal instructions, and operational regulations before altering control systems in the aircraft. Therefore, it would be desirable to have a method and apparatus that takes into account at least some of the issues discussed above as well as other possible issues.

SUMMARY

In one illustrative embodiment, an apparatus comprises an instruction analyzer. The instruction analyzer is configured to receive a movement instruction for an aircraft during movement of the aircraft. The instruction analyzer is further configured to generate a number of volumes of airspace defining desired movement of the aircraft using the movement instruction during the movement of the aircraft.

In another illustrative embodiment, a method for processing a movement instruction for an aircraft is present. The movement instruction for the aircraft is received during movement of the aircraft. A number of volumes of airspace defining desired movement of the aircraft is generated using the movement instruction during the movement of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The illustrative embodiments recognize and take into account a number of different considerations. For example, the illustrative embodiments recognize and take into account that in addition to having to process instructions received from air traffic management personnel, interpreting the instructions may be more difficult than desired. For example, the illustrative embodiments recognize and take into account that when verbal instructions are received, the quality of the communications link, the distractions from other events occurring in the flight deck, the amount of attention paid by the pilot, and other factors may result in an incorrect interpretation of the verbal instructions.

As a result, a pilot may not operate the aircraft as desired by air traffic management personnel if the instructions are incorrectly interpreted. For example, instructions to climb to a particular pre-determined altitude, to descend to a pre-determined altitude, or other instructions may be incorrectly interpreted resulting in undesired operation of the aircraft. For instance, a pilot may misinterpret instructions to climb as instructions to descend if the communications link with the air traffic management personnel is poor or the pilot is distracted by another conversation while receiving the instruction. In other cases, the pre-determined altitude may be interpreted incorrectly.

The different illustrative embodiments also recognize and take into account that although fewer errors may occur in interpretation with written instructions, these types of instructions may still take more time and effort than desired. For example, a pilot receiving written instructions takes time to view a display to read these instructions. The pilot also takes into account operational regulations that may place constraints on the written instructions based on the current operating conditions for the aircraft. The pilot also may make calculations to identify altitudes or other parameters for use in operating the aircraft from the written instructions and operational regulations.

Performing these tasks in response to receiving written instructions requires the pilot to focus on the instructions as well as possibly other tasks that are needed to operate the aircraft. The amount of time taken to process and implement the written instructions may be more than desired.

Thus, the illustrative embodiments provide a method and apparatus for processing movement instructions for operating an aircraft. In one illustrative embodiment, a method and apparatus is present for displaying movement instructions. For example, an apparatus may include an instruction analyzer that is configured to receive a movement instruction for an aircraft during flight of the aircraft. The instruction analyzer is configured to generate a number of volumes of airspace defining desired flight of the aircraft using the movement instruction during the flight of the aircraft. As used herein, a "number of", when used with reference to items, means one or more items. For example, a number of volumes of airspace is one or more volumes of airspace.

The number of volumes of airspace identified may be used in a number of different ways. For example, the number of volumes of airspace may be displayed on a display system to a pilot in the aircraft or to a pilot that is remotely operating the aircraft. In another example, the number of volumes of airspace may be used by a flight planning system to control the operation of the aircraft.

Figure 1:
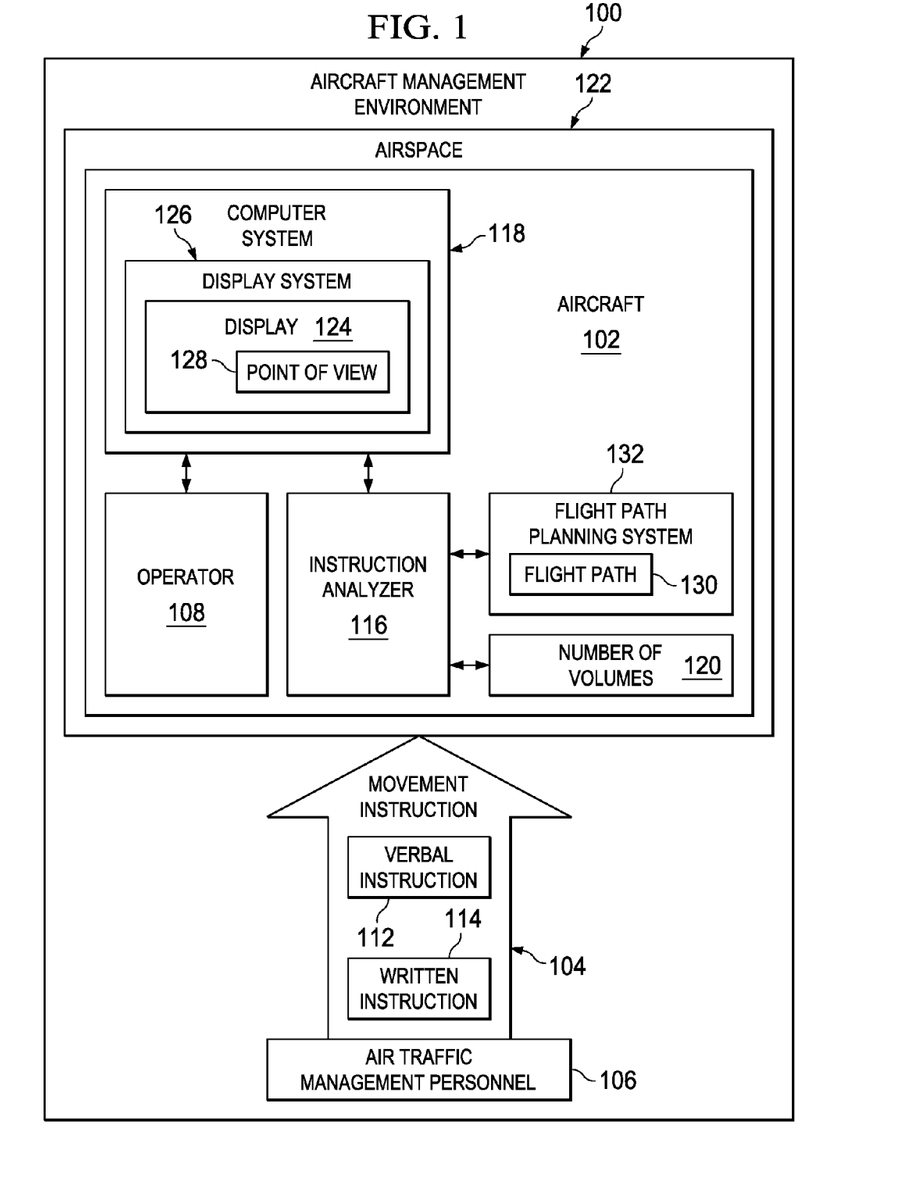
FIG. 1 is an illustration of a block diagram of an aircraft management environment in accordance with an illustrative embodiment.

With reference now to the figures and, in particular, with reference to FIG. 1, an illustration of a block diagram of an aircraft management environment is depicted in accordance with an illustrative embodiment. In this illustrative example, aircraft management environment 100 includes aircraft 102.

As depicted, as aircraft 102 operates, aircraft 102 may receive movement instruction 104 from air traffic management personnel 106. Movement instruction 104 is an instruction relating to the movement of aircraft 102 in these illustrative examples. Movement instruction 104 may be an instruction regarding operation of aircraft 102 that results in a change in position, orientation, or altitude of aircraft 102. This change may be while aircraft 102 is on the ground or in the air. Movement instruction 104 may be, for example, a command, a clearance, or some other suitable instruction.

In these illustrative examples, the operation of aircraft 102 may occur while aircraft 102 is on the ground or during flight in the air. In other words, aircraft 102 may receive movement instruction 104 from air traffic management personnel 106 while on the ground, taxiing on a runway, in a stationary position, or during flight of aircraft 102. Movement instruction 104 is received from air traffic management personnel 106 for use in operating aircraft 102. In these illustrative examples, movement instruction 104 may be received for use by operator 108 of aircraft 102.

Air traffic management personnel 106 is any personnel authorized to send movement instruction 104 for aircraft 102. In these illustrative examples, air traffic management personnel 106 may be part of an air traffic control service, airline operations center, ramp control service, or airplane maintenance organization.

In these illustrative examples, movement instruction 104 is an instruction regarding the operation of aircraft 102 and may take various forms. For example, without limitation, movement instruction 104 may take the form of clearances, changes in waypoints, changes in altitude, changes in procedures, or other changes regarding the operation of aircraft 102 during the flight of aircraft 102. In one illustrative example, a clearance given by air traffic management personnel 106 may be a clearance to land. In another example, a flight instruction in movement instruction 104 may be an instruction to fly at a particular heading, at a particular altitude, or some other suitable instruction.

In these illustrative examples, instruction analyzer 116 is located in aircraft 102. Instruction analyzer 116 receives movement instruction 104 for operator 108 during operation of aircraft 102. As depicted, instruction analyzer 116 is configured to reduce the amount of time and effort needed by operator 108 to operate aircraft 102 in response to receiving movement instruction 104.

Movement instruction 104 may take a number of different forms. For example, movement instruction 104 may be at least one of verbal instruction 112, written instruction 114, digital air traffic control instruction, and other suitable forms. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

In these illustrative examples, instruction analyzer 116 may be implemented using hardware, software, or a combination of the two. When software is used, the operations performed by the components may be implemented in the program code configured to be run on a processor unit. When hardware is employed, the hardware may include circuits that operate to perform the operations in the components.

The hardware may take the form of, for example, a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices.

Additionally, the processes may be implemented in organic components integrated with inorganic components and/or may be comprised entirely of organic components excluding a human being. For example, integrated circuits may be formed on organic semiconductors.

For example, instruction analyzer 116 may be implemented in hardware, software, or both within computer system 118. Computer system 118 is one or more computers. When more than one computer is present in computer system 118, those computers may be in communication with each other through a medium, such as a network.

When instruction analyzer 116 receives movement instruction 104, instruction analyzer 116 generates number of volumes 120 of airspace 122. In these illustrative examples, number of volumes 120 of airspace 122 defines the desired flight of aircraft 102.

Number of volumes 120 of airspace 122 is generated using movement instruction 104 during the flight of aircraft 102 in real-time or as close to real-time as possible. In other words, number of volumes 120 of airspace 122 is generated as quickly as possible when movement instruction 104 is received. Number of volumes 120 of airspace 122 is generated without any intentional delay in the processing of movement instruction 104.

In these illustrative examples, instruction analyzer 116 displays information on display system 126. Display system 126 is located within computer system 118 and includes a number of display devices. For example, a display device in display system 126 may be a navigation display in the flight deck of aircraft 102. In another example, the display device may be a heads-up display that displays information on the windshield in the flight deck. In another illustrative example, the display device may be on a faceplate of a helmet.

Display 124 is displayed on display system 126 with number of volumes 120 of airspace 122. Display 124 is the information that is sent to display system 126 that is needed to display number of volumes 120 of airspace 122. As depicted, display 124 is generated from point of view 128. Point of view 128 may take a number of different forms. For example, point of view 128 may be a view from the flight deck, a view from a location exterior to aircraft 102, or some other suitable point of view.

In other illustrative examples, number of volumes 120 of airspace 122 may be used in a different manner in addition to or other than generating display 124. For example, number of volumes 120 of airspace 122 may be used to generate flight path 130. In these illustrative examples, number of volumes 120 of airspace 122 may be sent to flight path planning system 132 for use in generating flight path 130. Flight path planning system 132 may be, for example, without limitation, a navigation system, a flight management system, or some other computer system in aircraft 102.

In these illustrative examples, flight path 130 is a direction of travel for aircraft 102. In other words, flight path 130 may be a vector for aircraft 102. Of course, in some illustrative examples, flight path 130 may be a path from a current location of aircraft 102 to a destination location. Flight path 130 may be used to control the path of aircraft 102 directly or may be presented to operator 108 for consideration.

In this manner, operator 108 may be provided a visualization of movement instruction 104 by instruction analyzer 116. With this visualization of movement instruction 104, operator 108 may more quickly perform operations with aircraft 102 to follow movement instruction 104 as well as perform other operations in flying aircraft 102. For example, translating verbal instruction 112 into an identification of operations and making calculations for altitudes, headings, and other parameters may be unnecessary with the visualization of movement instruction 104 through display 124 of number of volumes 120 of airspace 122 on display system 126. In another illustrative example, the visualization of movement instruction 104 through display 124 of number of volumes 120 on display system 126 may include an overlay of weather hazards detected by radar. This type of visualization may enable operator 108 to more easily identify undesirable conditions in following movement instruction 104.

Figure 2:
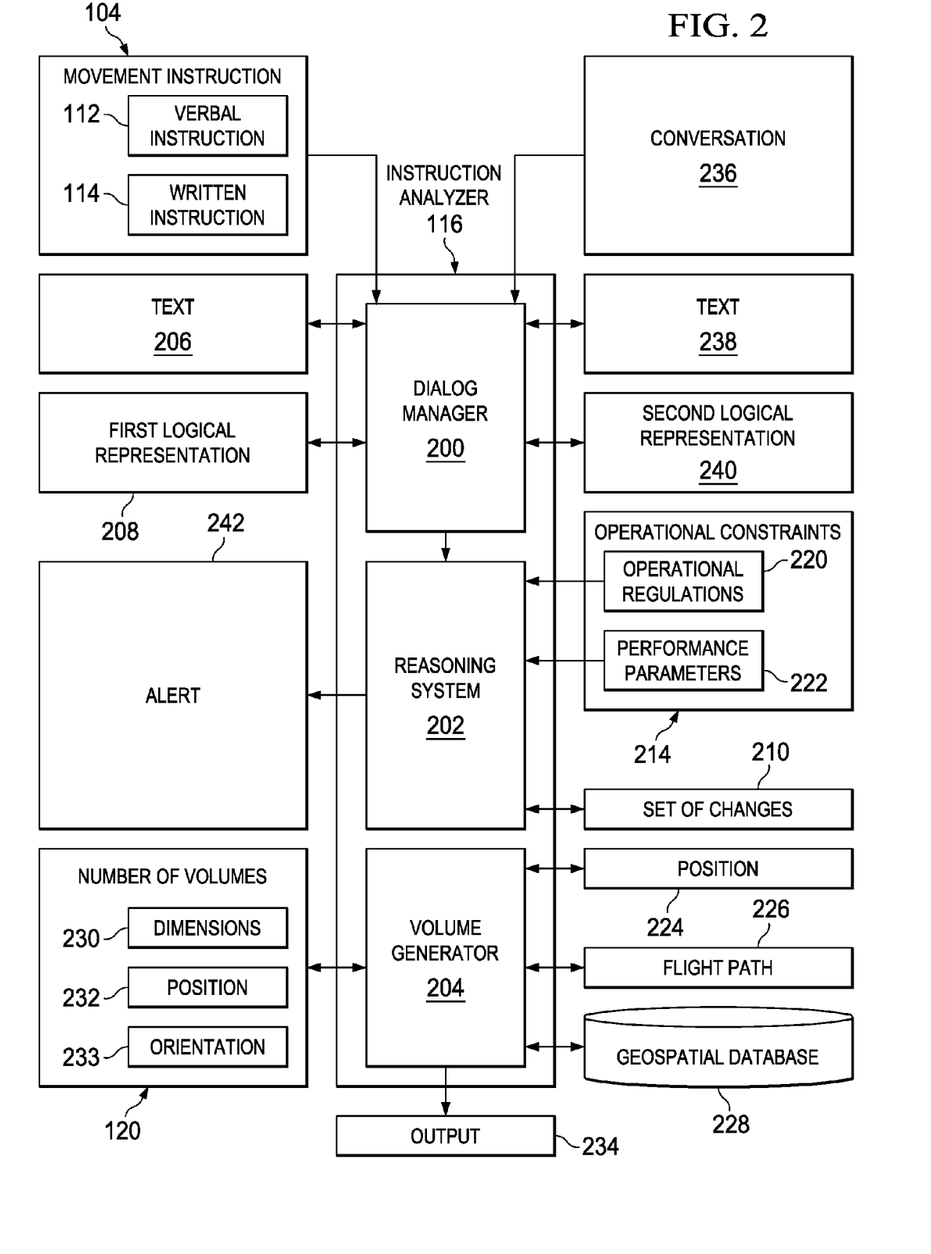
FIG. 2 is an illustration of a block diagram of an implementation for an instruction analyzer in accordance with an illustrative embodiment.

Turning next to FIG. 2, an illustration of a block diagram of an implementation for an instruction analyzer is depicted in accordance with an illustrative embodiment. Examples of components that may be used in instruction analyzer 116 in FIG. 1 are depicted.

As depicted in this illustrative example, instruction analyzer 116 includes dialog manager 200, reasoning system 202, and volume generator 204. These components in instruction analyzer 116 may be implemented using hardware, software, or some combination thereof.

Dialog manager 200 is configured to receive movement instruction 104 in the form of verbal instruction 112 or written instruction 114. Dialog manager 200 is configured to convert verbal instruction 112 into text 206. Dialog manager 200 is also configured to convert text 206 into first logical representation 208 of verbal instruction 112 or written instruction 114.

Dialog manager 200 may implement processes to generate first logical representation 208 from text 206. For example, without limitation, dialog manager 200 may implement an artificial intelligence system, a neural network, fuzzy logic, and other suitable systems. These systems may implement natural language processing for generating first logical representation 208 from text 206. In these illustrative examples, first logical representation 208 is a computer representation of the meaning of movement instruction 104. For example, if movement instruction 104 is to descend, first logical representation 208 will take into consideration whether the airplane is cleared to go above or below a certain altitude.

Reasoning system 202 is configured to enhance or otherwise modify first logical representation 208. In these illustrative examples, reasoning system 202 is configured to generate set of changes 210 based on operational constraints 214. A "set", as used herein with reference to items, means zero or more items. For example, set of changes 210 may be zero changes, one change, five changes, or some other suitable number of changes.

Operational constraints 214 are constraints that may limit the operation of aircraft 102 in FIG. 1 in following movement instruction 104. Operational constraints 214 may include, for example, without limitation, no-fly zones, desired ranges of banking speed, desired ranges of velocity for travel through airspace 122 in FIG. 1, reserve fuel capacity, or other types of operational constraints for aircraft 102. Operational constraints 214 may vary, depending on the type of airspace, the type of aircraft, or both.

As another example, operational constraints 214 may include operational regulations 220. Operational regulations 220 are rules that apply to the operation of aircraft 102. These rules may be propagated by an authority, such as the Federal Aviation Administration or another entity. First logical representation 208 may be compared to operational regulations 220 to determine whether a constraint to verbal instruction 112 is present. If a constraint is present, a change is added to set of changes 210.

In still another example, operational constraints 214 may include performance parameters 222 for aircraft 102. Performance parameters 222 are parameters describing the performance of aircraft 102. In particular, these parameters may include limits to maneuvers and other operations that may be performed by aircraft 102.

For example, performance parameters 222 may include an upper altitude limit for operating aircraft 102. Verbal instruction 112 may specify an upper altitude limit for aircraft 102. If performance parameters 222 indicate a lower upper altitude limit, a change may be added to set of changes 210 to modify first logical representation 208 to reflect the upper altitude limit of aircraft 102 from performance parameters 222 rather than the upper altitude limit specified in verbal instruction 112.

Reasoning system 202 applies set of changes 210 to first logical representation 208. If set of changes 210 is an empty set, first logical representation 208 does not change.

Volume generator 204 is configured to use first logical representation 208 as modified by set of changes 210 to generate number of volumes 120 of airspace 122. In these illustrative examples, volume generator 204 uses position 224 and flight path 226 of aircraft 102 along with first logical representation 208 to generate number of volumes 120 of airspace 122. Position 224 is the position of aircraft 102 in three-dimensional space. Flight path 226 indicates a direction of travel of aircraft 102.

More specifically, volume generator 204 generates dimensions 230, position 232, and orientation 233 for number of volumes 120 of airspace 122. Volume generator 204 uses position 224 of aircraft 102 and flight path 226 to generate position 232 and orientation 233 for number of volumes 120 of airspace 122. Position 232 is the position of each volume in number of volumes 120 of airspace 122. Orientation 233 is the orientation of each of number of volumes 120 of airspace 122. In these illustrative examples, position 232 and orientation 233 are relative to position 224 and flight path 226 of aircraft 102.

Dimensions 230 describe a shape for each volume in number of volumes 120 of airspace 122. Dimensions 230 are generated using first logical representation 208 with any modifications from set of changes 210.

As depicted, volume generator 204 uses geospatial database 228 to identify at least one of dimensions 230, position 232, and orientation 233 for number of volumes 120 of airspace 122. Geospatial database 228 is a database of information used to generate number of volumes 120 of airspace 122. The information may include, for example, at least one of waypoint locations, airspace maps, and other suitable types of information. Geospatial database 228 includes an identification of volumes that may be used based on first logical representation 208 within any modifications from set of changes 210.

For example, if first logical representation 208 is an altitude change, a volume may be selected for number of volumes 120 of airspace 122 as a volume in which aircraft 102 should fly to reach the altitude change. In another illustrative example, a first volume and a second volume may be selected for number of volumes 120 of airspace 122. The first volume and the second volume may define airspace in which aircraft 102 may not fly. These two volumes may be arranged to form a corridor in which aircraft 102 should fly. In other words, the first volume may be placed above the corridor, and the second volume may be placed below the corridor.

Volume generator 204 is configured to generate output 234. In these illustrative examples, output 234 includes dimensions 230, position 232, and orientation 233 for number of volumes 120 of airspace 122. Output 234 may then be displayed within display 124 in display system 126 in FIG. 1, used to change flight path 130 of aircraft 102 in FIG. 1, or used to perform other operations.

Additionally, instruction analyzer 116 may be used to check the accuracy of movement instruction 104. In particular, instruction analyzer 116 may use conversation 236 to determine whether movement instruction 104 has an appropriate context for the current operation of aircraft 102. In these illustrative examples, conversation 236 may be communication by operator 108, air traffic management personnel 106 in FIG. 1, or both. Conversation 236 may be at least one of voice, written, and other types of data communications identified prior to receiving movement instruction 104.

In these illustrative examples, conversation 236 may be processed by dialog manager 200 to generate text 238 for conversation 236. In a similar fashion, dialog manager 200 may generate second logical representation 240 from text 238. Second logical representation 240 for text 238 generated from conversation 236 may be compared to first logical representation 208 generated from movement instruction 104. This comparison may be performed by reasoning system 202. A determination may be made as to whether movement instruction 104 appears to be accurate in the context of conversation 236 from the comparison of second logical representation 240 with first logical representation 208.

For example, verbal instruction 112 may be a clearance to descend to a lower altitude. If, in conversation 236, operator 108 requested permission to climb to a higher altitude, the clearance to descend to a lower altitude does not fit the context of conversation 236. In these illustrative examples, conversation 236 may include verbal instructions, written instructions, or both. In these illustrative examples, conversation 236 provides context for movement instruction 104.

In these illustrative examples, reasoning system 202 may identify this inconsistency through a comparison of second logical representation 240 of conversation 236 with first logical representation 208 for movement instruction 104. These types of comparisons may be made using various processes, such as an artificial intelligence system, a neural network, fuzzy logic, or some other suitable system.

If an inconsistency is identified, reasoning system 202 may generate alert 242. Alert 242 may take a number of different forms. For example, without limitation, alert 242 may be a display of text, a graphical indicator, an audible alert, or some other suitable type of alert to indicate that an inconsistency between verbal instruction 112 and conversation 236 is present.

Alert 242 may be used by operator 108 to verify the accuracy of movement instruction 104. For example, operator 108 may request confirmation of verbal instruction 112 from air traffic management personnel 106.

The illustrations of aircraft management environment 100 in FIG. 1 and instruction analyzer 116 in FIGS. 1 and 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although display 124 displayed by display system 126 is depicted and described as being located in aircraft 102, display 124 in display system 126 may be located in other locations. For example, display 124 may be generated on display system 126 in a location remote to aircraft 102.

In another illustrative example, instruction analyzer 116 may be in a location remote to aircraft 102. For example, instruction analyzer 116 may be located in a facility. This facility may be on the ground or in another aircraft. Operator 108 may remotely pilot aircraft 102 when aircraft 102 takes the form of an unmanned aerial vehicle. In this example, movement instruction 104 is received by instruction analyzer 116 at the facility instead of in aircraft 102. With this implementation, display 124 is from point of view 128 of aircraft 102 and is displayed on a display device in display system 126 located at the facility.

In these illustrative examples, instruction analyzer 116 may be applied to generate number of volumes 120 from movement instruction 104 for aircraft 102 for movement on the ground as well as in the air. Thus, the illustrative embodiments may be applied to any movement of aircraft 102, whether on the ground, on the water, or in the air.

Figure 3:
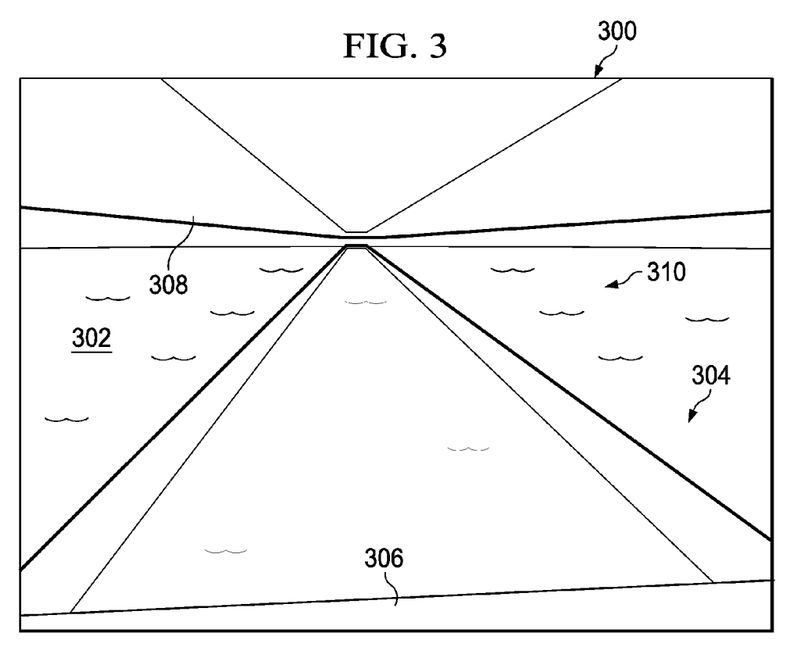
FIG. 3 is an illustration of a display of a number of volumes of airspace for the desired flight of an aircraft in accordance with an illustrative embodiment.

Turning next to FIG. 3, an illustration of a display of a number of volumes of airspace for the desired flight of an aircraft is depicted in accordance with an illustrative embodiment. In this illustrative example, display 300 is an example of display 124 in FIG. 1. Display 300 is from the point of view from the flight deck of an aircraft. This example may be generated in response to verbal instruction 112 from air traffic management personnel 106, such as "Aircraft one two three, you are cleared to altitude one thousand feet."

As depicted, terrain 302 is present in display 300 with number of volumes 304. Number of volumes 304 includes volume 306 and volume 308. In this illustrative example, number of volumes 304 is used to define the airspace in which an aircraft should travel.

In these illustrative examples, number of volumes 304 is used to indicate an altitude at which the aircraft should fly. These two volumes are positioned relative to each other to identify corridor 310. Corridor 310 is the airspace in which the aircraft should fly.

In particular, volume 306 and volume 308 define airspace in which the aircraft should not fly. In other words, the aircraft should not fly into volume 306 and volume 308 from its present location within corridor 310.

For example, if the aircraft increases or decreases altitude, the view from display 300 will show the aircraft moving closer to either volume 306 or volume 308 in display 300. If too much of an altitude change occurs, the aircraft will fly into one of volume 306 or volume 308. In other words, the height of these volumes does not change as the point of view changes, because they define altitude limits for the aircraft.

In this illustrative example, the position of volume 306 and volume 308 will change orientation with respect to changes in direction. In other words, volume 306 and volume 308 continue to extend in front of the point of view in display 300 when the aircraft changes direction in this illustrative example.

Figure 4:
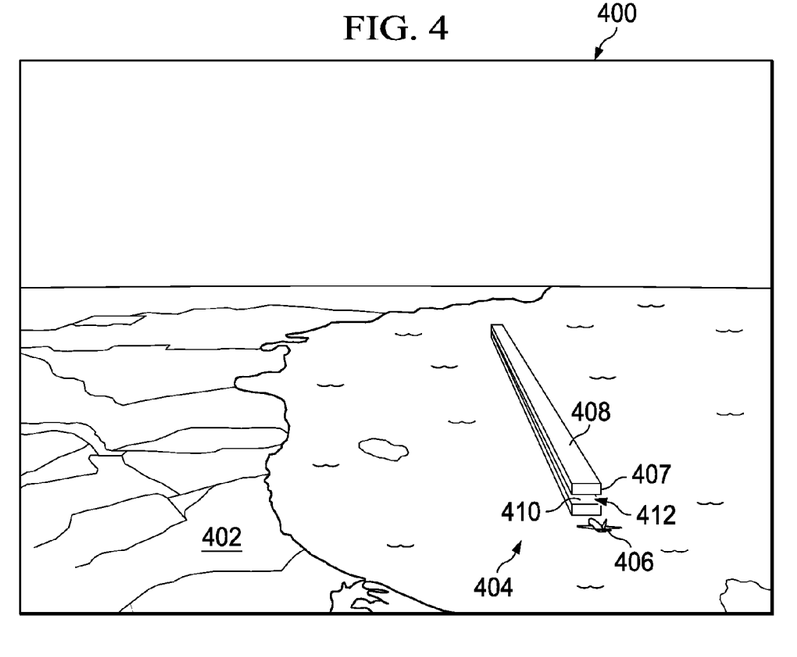
FIG. 4 is an illustration of a number of volumes of airspace for the desired flight of an aircraft in accordance with an illustrative embodiment.

With reference now to FIG. 4, an illustration of a number of volumes of airspace for the desired flight of an aircraft is depicted in accordance with an illustrative embodiment. In this illustrative example, display 400 is an example of display 124 in FIG. 1. Display 400 is from the point of view from a location outside of an aircraft in this depicted example. This example may be generated in response to verbal instruction 112 from air traffic management personnel 106, such as "Aircraft one two three, you are cleared to altitude five thousand feet."

As depicted, display 400 includes terrain 402 and number of volumes 404. Graphical representation 406 is displayed relative to end 407 of number of volumes 404. Graphical representation 406 is a graphical representation of the aircraft. Graphical representation 406 indicates a current position and flight path for the aircraft.

Number of volumes 404 includes volume 408 and volume 410. In particular, these two volumes are used to define airspace in which the aircraft should fly with respect to altitude. As depicted, volume 408 and volume 410 define corridor 412. Corridor 412 is the airspace through which the aircraft should fly along its current flight path. Corridor 412 has an altitude for the desired flight of the aircraft.

If the aircraft changes the direction of flight, number of volumes 404 may be displayed in a new position such that volume 408 and volume 410 are above and below graphical representation 406 of the aircraft. However, if the aircraft changes altitude, graphical representation 406 may change altitude in display 400, but number of volumes 404 remain fixed with respect to the altitude at which they are displayed in display 400.

Figure 5:
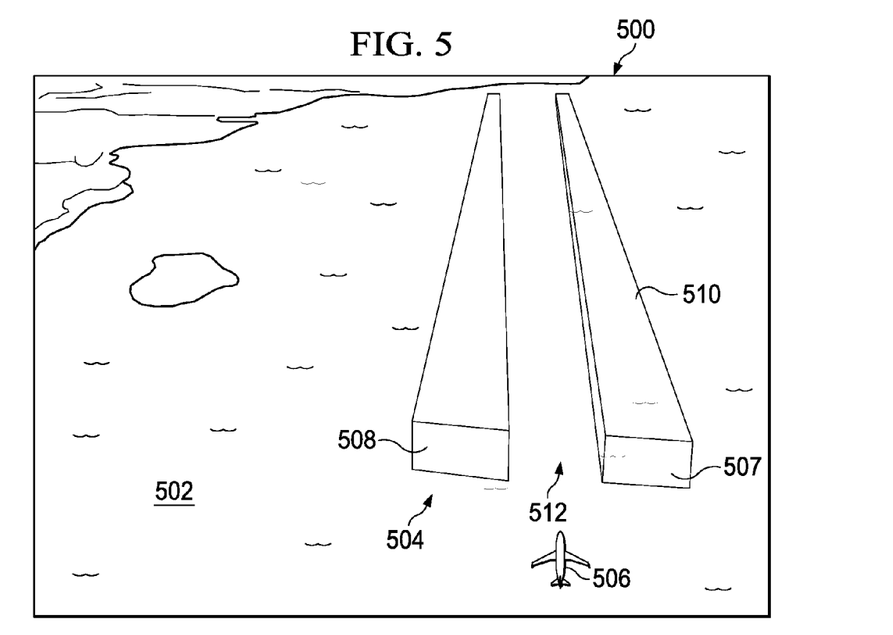
FIG. 5 is an illustration of a number of volumes of airspace for the desired flight of an aircraft in accordance with an illustrative embodiment.

With reference now to FIG. 5, an illustration of a number of volumes of airspace for the desired flight of an aircraft is depicted in accordance with an illustrative embodiment. In this illustrative example, display 500 is an example of display 124 in FIG. 1. Display 500 is from the point of view from a location outside of an aircraft in this depicted example. This example may be generated in response to verbal instruction 112 from air traffic management personnel 106, such as "Aircraft one two three, you are cleared to divert up to ten miles left of course."

In this illustrative example, display 500 shows terrain 502 and number of volumes 504. Graphical representation 506 of the aircraft is shown at end 507 of number of volumes 504. In this illustrative example, number of volumes 504 is shown in display 500 to indicate a flight path for the aircraft.

In display 500, number of volumes 504 includes volume 508 and volume 510. Volume 508 and volume 510 are positioned next to each other such that they are located on either side of graphical representation 506. Volume 508 and volume 510 define corridor 512. Corridor 512 is the airspace in which the aircraft should fly. Volume 508 and volume 510 define the airspace in which the aircraft should not fly.

In this illustrative example, if the aircraft changes altitude, number of volumes 504 is repositioned with respect to their altitude in display 500. If the aircraft changes the direction of travel, number of volumes 504 is not changed with respect to the direction in which these volumes extend.

Figure 6:
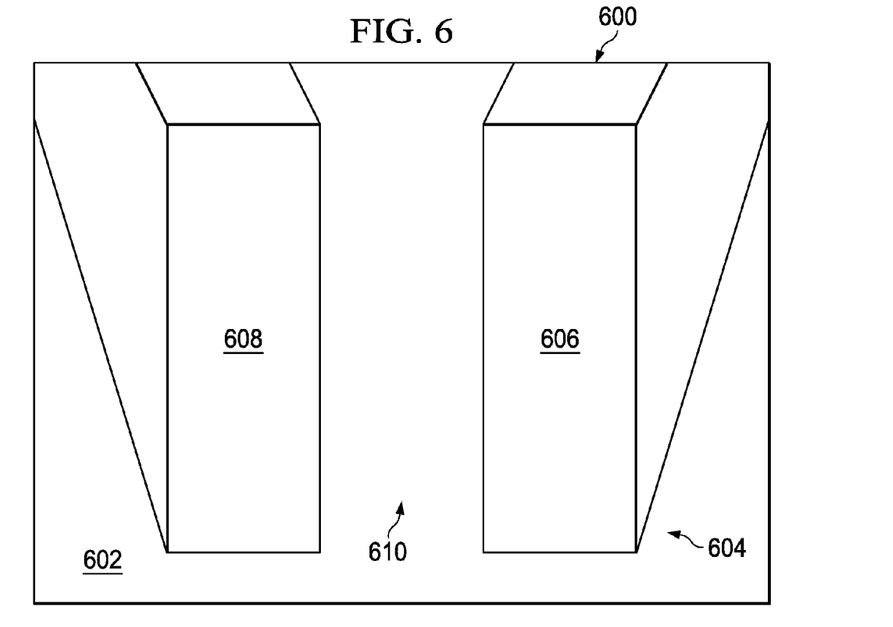
FIG. 6 is an illustration of a number of volumes of airspace for the desired flight of an aircraft in accordance with an illustrative embodiment.

With reference now to FIG. 6, an illustration of a number of volumes of airspace for desired flight of an aircraft is depicted in accordance with an illustrative embodiment. In this illustrative example, display 600 is an example of display 124 in FIG. 1. Display 600 is from the point of view from a flight deck of an aircraft in this depicted example. This example may be generated in response to verbal instruction 112 from air traffic management personnel 106, such as "Aircraft one two three, you are cleared to divert up to twenty five degrees left of course."

In this illustrative example, display 600 shows terrain 602 and number of volumes 604. Number of volumes 604 includes volume 606 and volume 608. As depicted, number of volumes 604 is shown in display 600 to indicate a desired flight path for the aircraft. In other words, number of volumes 604 indicates a direction in which the aircraft should fly.

Volume 606 and volume 608 are positioned next to each other such that they are located on either side of the point of view from the flight deck of the aircraft. Volume 606 and volume 608 define corridor 610. Corridor 610 is the airspace in which the aircraft should fly.

Volume 606 and volume 608 define the airspace in which the aircraft should not fly. If the aircraft deviates from the direction defined by corridor 610, the aircraft may enter volume 606 or volume 608. The entering of this volume may result in an alert being generated to indicate the deviation from the desired flight path.

Figure 7:
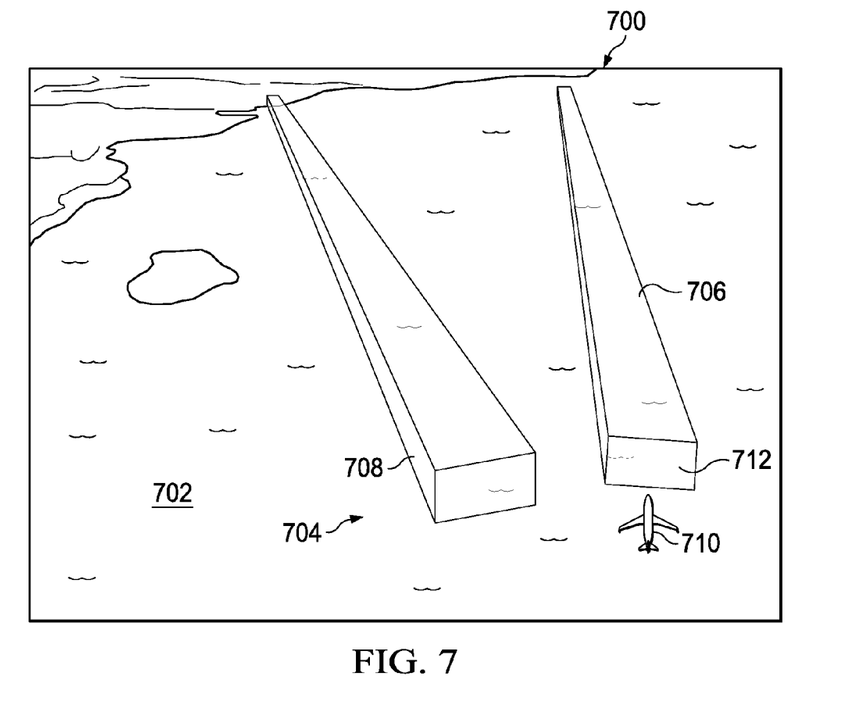
FIG. 7 is an illustration of a number of volumes of airspace for the desired flight of an aircraft in accordance with an illustrative embodiment.

With reference now to FIG. 7, an illustration of a number of volumes of airspace for the desired flight of an aircraft is depicted in accordance with an illustrative embodiment. In this illustrative example, display 700 is an example of display 124 in FIG. 1. Display 700 is from the point of view from a location outside of an aircraft in this depicted example. In this illustrative example, a flight instruction is received to change the flight path of the aircraft. This example may be generated in response to verbal instruction 112 from air traffic management personnel 106, such as "Aircraft one two three, you are cleared to deviate thirty degrees left of current heading."

As depicted, display 700 shows terrain 702 and number of volumes 704. Number of volumes 704 includes volume 706 and volume 708. Volume 706 in number of volumes 704 defines the airspace in which the aircraft is currently traveling. In particular, volume 706 defines airspace for a current flight path, while volume 708 defines airspace for a new flight path in flight instructions that have been received for the aircraft.

In this illustrative example, graphical representation 710 is shown at end 712 of volume 706. Volume 708 defines the airspace in which the aircraft should fly. Unlike the illustrations of the volumes in FIGS. 3-6, the aircraft should fly within volume 708.

The new flight path is indicated by volume 708 in number of volumes 704. As the aircraft changes to fly along the new flight path as defined by volume 708, graphical representation 710 may move in display 700 to show the position of the aircraft relative to volume 706 and volume 708. When the aircraft flies in the flight path as defined by volume 708, volume 706 may be removed from display 700.

The illustration of the displays in FIGS. 3-7 is not meant to imply limitations to the manner in which an illustrative embodiment may be implemented. For example, the displays shown in FIGS. 3-7 are shown as three-dimensional displays. In other illustrative embodiments, the display may take other forms, such as one or more two-dimensional displays. For example, without limitation, a top down display, a vertical situation display, or some other combination of two-dimensional displays may be used. As another example, in other implementations, the terrain may be omitted from the display.

In yet another example, text may be included in the display to provide information about the flight instruction. For example, a heading, an altitude, or other information may be displayed within the number of volumes of airspace. In still another illustrative example, displays may be generated for an aircraft moving on the ground or on the water in addition to the examples shown in the air.

In still another illustrative example, some of the number of volumes of airspace in a display may define airspace in which the aircraft should fly, while others in the number of volumes of airspace in the same display may define airspace that should be avoided by the aircraft.

In still another illustrative example, some of the number of volumes of airspace in a display may be defined by non-rectangular geometry. For example, some of the number of volumes may be defined by a swept volume.

Figure 8:
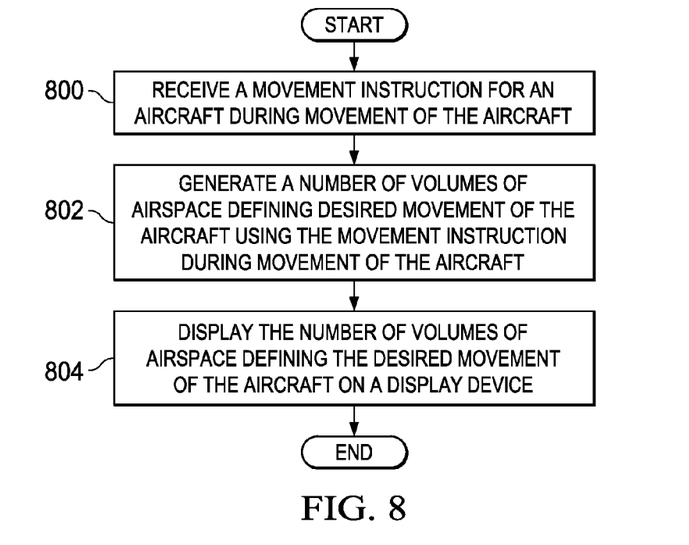
FIG. 8 is an illustration of a flowchart of a process for processing a movement instruction for an aircraft in accordance with an illustrative embodiment.

Turning next to FIG. 8, an illustration of a flowchart of a process for processing a movement instruction for an aircraft is depicted in accordance with an illustrative embodiment. The process illustrated in FIG. 8 may be implemented in aircraft management environment 100 in FIG. 1. In particular, the process may be implemented in instruction analyzer 116 as depicted in FIG. 1 and FIG. 2.

The process begins by receiving a movement instruction for an aircraft during movement of the aircraft (operation 800). The process then generates a number of volumes of airspace defining desired movement of the aircraft using the movement instruction during movement of the aircraft (operation 802). The airspace in the number of volumes of airspace may be airspace in which the aircraft should move, avoid, or some combination thereof. The aircraft may move on the ground or in the air in these illustrative examples. When on the ground, the airspace may be the airspace above the ground.

The process then displays the number of volumes of airspace defining the desired movement of the aircraft on a display device (operation 804), with the process terminating thereafter. Of course, operation 804 is an optional operation. This operation may be omitted or replaced with a different operation. For example, a different operation may be one in which a route is planned for the aircraft using the number of volumes of airspace.

Figure 9:
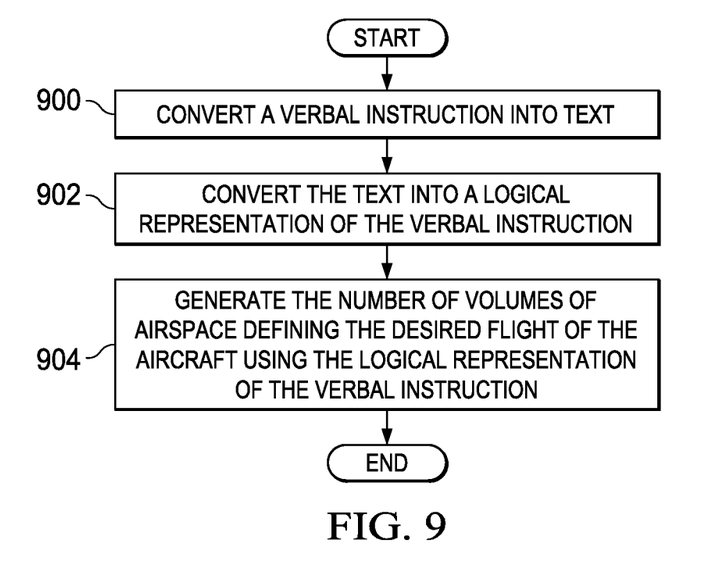
FIG. 9 is an illustration of a flowchart of a process for generating a number of volumes of airspace defining the desired flight of an aircraft using a flight instruction during flight of the aircraft in accordance with an illustrative embodiment.

Turning next to FIG. 9, an illustration of a flowchart of a process for generating a number of volumes of airspace defining the desired flight of an aircraft using a flight instruction during flight of the aircraft is depicted in accordance with an illustrative embodiment. The process illustrated in FIG. 9 is an example of one implementation of operation 802 in FIG. 8. This process is used to process a flight instruction in the form of a verbal instruction.

The process begins by converting a verbal instruction into text (operation 900). Thereafter, the text is converted into a logical representation of the verbal instruction (operation 902). The process then generates the number of volumes of airspace defining the desired flight of the aircraft using the logical representation of the verbal instruction (operation 904), with the process terminating thereafter. Operation 904 may generate dimensions, a position, and an orientation for the number of volumes of airspace.

Figure 10:
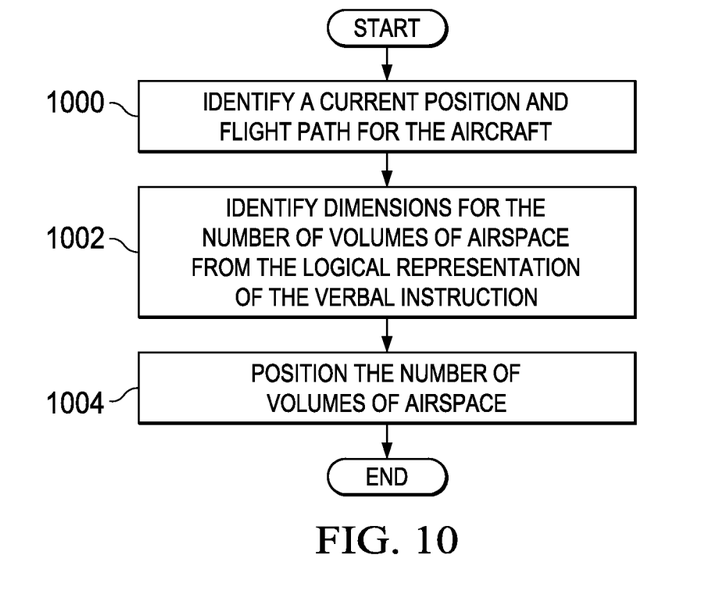
FIG. 10 is an illustration of a flowchart of a process for generating a number of volumes of airspace in accordance with an illustrative embodiment.

Turning next to FIG. 10, an illustration of a flowchart of a process for generating a number of volumes of airspace is depicted in accordance with an illustrative embodiment. The process illustrated in FIG. 10 is an example of operation 904 in FIG. 9.

The process begins by identifying a current position and flight path for the aircraft (operation 1000). The process then identifies dimensions for the number of volumes of airspace from the logical representation of the verbal instruction (operation 1002). These dimensions may be defined to encompass the airspace through which the aircraft should travel or to define airspace through which the aircraft should not travel.

The process then positions the number of volumes of airspace (operation 1004). This positioning includes location and orientation for each volume in the number of volumes of airspace. The process terminates thereafter.

Figure 11:
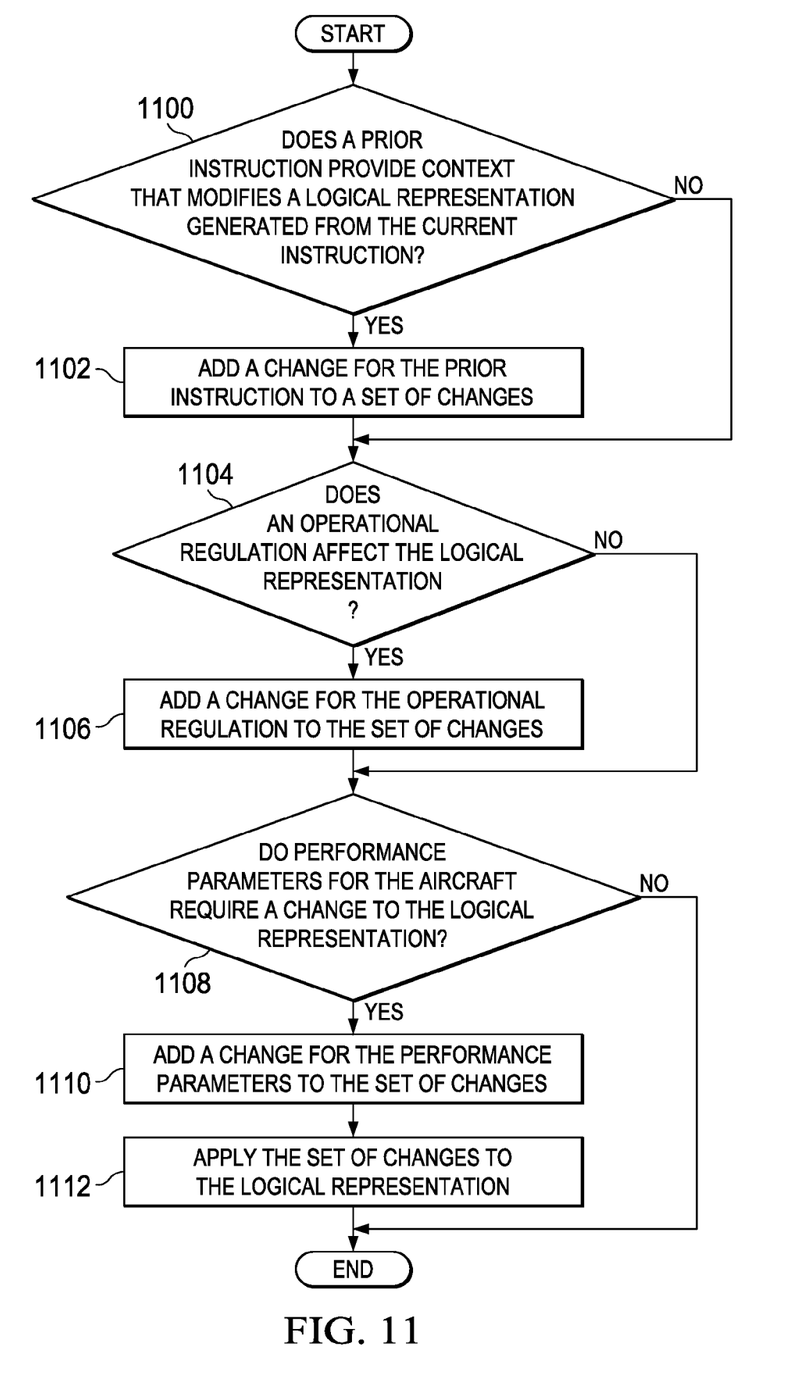
FIG. 11 is an illustration of a flowchart of a process for modifying a logical representation in accordance with an illustrative embodiment.

Turning next to FIG. 11, an illustration of a flowchart of a process for modifying a logical representation is depicted in accordance with an illustrative embodiment. This process may be implemented in reasoning system 202 in FIG. 2 to identify modifications to instructions based on various constraints.

The process begins by determining whether a prior instruction provides context that modifies a logical representation generated from the current instruction (operation 1100). If the prior instruction modifies the logical representation, a change for the prior instruction is added to a set of changes (operation 1102). The process then determines whether an operational regulation affects the logical representation (operation 1104).

If an operational regulation does affect the logical representation, a change for the operational regulation is added to the set of changes (operation 1106). Thereafter, a determination is made as to whether performance parameters for the aircraft require a change to the logical representation (operation 1108).

If the performance parameters do require a change, a change for the performance parameters is added to the set of changes (operation 1110). The process then applies the set of changes to the logical representation (operation 1112), with the process terminating thereafter.

With reference again to operation 1100, if the prior instruction does not modify the logical representation, the process proceeds to operation 1104. In operation 1104, if an operational regulation does not affect the logical representation, the process proceeds to operation 1108. In operation 1108, if performance parameters for the aircraft do not require a change to the logical representation, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 12:
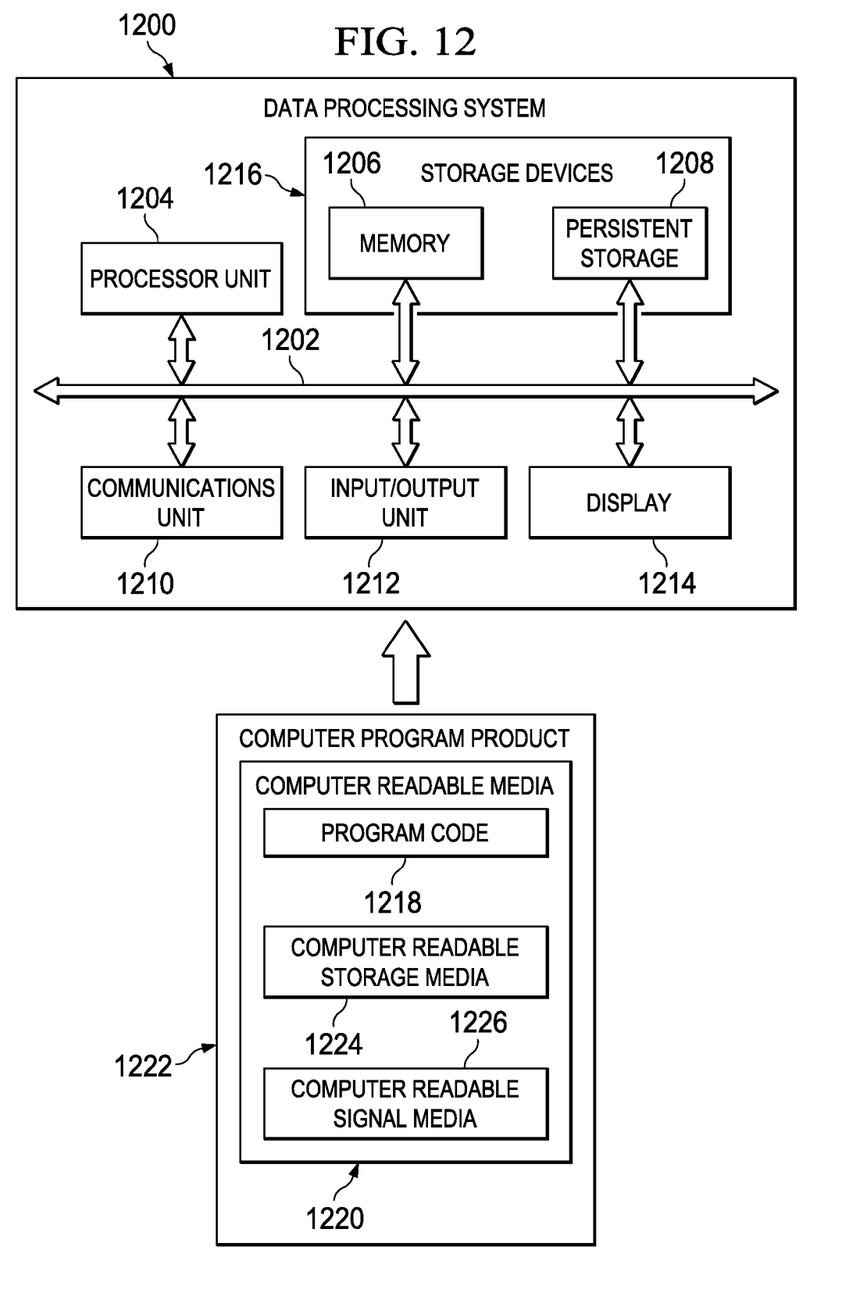
FIG. 12 is an illustration of a data processing system in accordance with an illustrative embodiment.

Turning now to FIG. 12, an illustration of a data processing system is depicted in accordance with an illustrative embodiment. Data processing system 1200 may be used to implement computer system 118 in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In these examples, communications framework 1202 may be a bus system.

Processor unit 1204 serves to execute instructions for software that may be loaded into memory 1206. Processor unit 1204 may be a number of processors, a multi-processor core, or some other type of processor, depending on the particular implementation. A number, as used herein with reference to an item, means one or more items. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications framework 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226.

Computer readable storage media 1224 may include, for example, an optical or magnetic disk that is inserted or placed into a drive or other device that is part of persistent storage 1208 for transfer onto a storage device, such as a hard drive, that is part of persistent storage 1208. Computer readable storage media 1224 also may take the form of a persistent storage, such as a hard drive, a thumb drive, or a flash memory, that is connected to data processing system 1200. In some instances, computer readable storage media 1224 may not be removable from data processing system 1200.

In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is a media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications framework 1202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1206 or a cache, such as found in an interface and memory controller hub that may be present in communications framework 1202.

Figure 13:
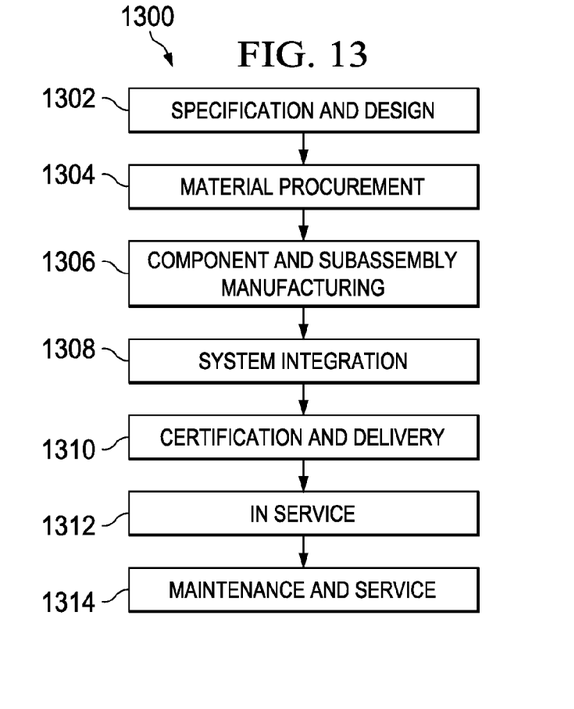
FIG. 13 is an illustration of an aircraft manufacturing and service method in accordance with an illustrative embodiment.
Figure 14:
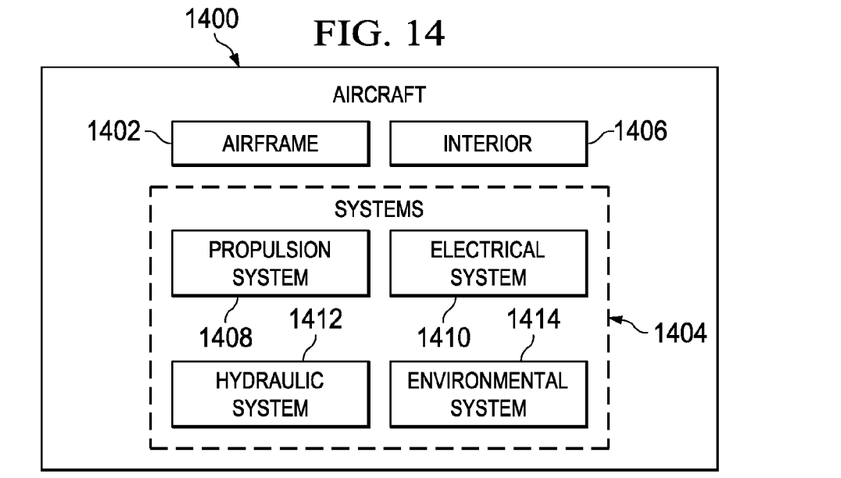
FIG. 14 is an illustration of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406.

Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. For example, an instruction analyzer may be implemented in computer systems for aircraft 1400 during specification and design 1302. In still other illustrative examples, an instruction analyzer may be used in aircraft 1400 to aid in the operation of aircraft 1400 while in service 1312. Further, aircraft 1400 may be upgraded to include an instruction analyzer during maintenance and service 1314.

Although the illustrative examples are described with respect to an aircraft, an illustrative embodiment may be used to analyze verbal instructions for operation in other vehicles other than aircraft, such as, for example, without limitation, a submarine, a personnel carrier, a tank, a train, an automobile, a bus, a spacecraft, a surface ship, and other suitable vehicles.

Thus, the illustrative embodiments provide a method and apparatus for visualizing instructions. In particular, the different illustrative embodiments may be used to visualize both written and verbal instructions that may be received from air traffic management personnel or other sources. In these illustrative examples, an operator of an aircraft may more efficiently operate the aircraft when receiving flight instructions. The amount of time needed to process instructions may be reduced as compared to current methods for operating an aircraft when receiving flight instructions.

The illustrative embodiments allow an operator of the aircraft to visualize the airspace in which an aircraft should operate to reduce operating in undesired conditions. For example, with an illustrative embodiment, an operator may more safely maneuver around or in operating conditions, such as severe weather, other aircraft, terrain, and other conditions that may undesirably affect the operation of the aircraft.

The illustrative examples display volumes of airspace on a display that correspond to areas in which an aircraft may fly or avoid. In these illustrative examples, the display of these volumes of airspace is in real-time or as close to real-time as possible. In other words, the display is made as quickly as possible without delay. In these illustrative examples, with the display of volumes, the processing of flight instructions may be reduced.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising: an instruction analyzer that receives a movement instruction for an aircraft received by the aircraft during movement of the aircraft; generates in real time, using the movement instruction, a number of volumes of airspace defining a desired flight path for the aircraft, expression; the instruction analyzer comprising a reasoning system that generates a set of changes to a logical expression; the instruction analyzer further displays the number of volumes of airspace on a display system during the movement of the aircraft, wherein the display system is in a location selected from one of a location in the aircraft and a location remote to the aircraft.

2. The apparatus of claim 1, wherein the instruction analyzer generates a route for the aircraft using the number of volumes of airspace.

3. The apparatus of claim 1, such that the instruction analyzer displays the number of volumes of airspace relative to a position of the aircraft.

4. The apparatus of claim 3, wherein the display of the number of volumes of airspace relative to the position of the aircraft is from a point of view from a flight deck of the aircraft.

5. The apparatus of claim 3, wherein the display of the number of volumes of airspace relative to the position of the aircraft is from a point of view outside of the aircraft.

6. The apparatus of claim 1, wherein the number of volumes of airspace defines where the aircraft should operate.

7. The apparatus of claim 1, wherein the number of volumes of airspace defines where the aircraft should not operate.

8. The apparatus of claim 1, wherein the instruction analyzer comprises:
a dialog manager that receives the movement instruction in a form of a verbal instruction; convert the verbal instruction into text and convert the text into a logical representation of the verbal instruction; and
a volume generator that generates the number of volumes of airspace defining the desired flight path of the aircraft using the logical representation of the verbal instruction.

9. The apparatus of claim 8, wherein the instruction analyzer further comprises:
the reasoning system that identifies the set of changes to the logical representation and modify the logical representation using the set of changes, wherein the volume generator generates the number of volumes of airspace defining the desired flight path of the aircraft using the logical representation of the verbal instruction as modified by the set of changes.

10. The apparatus of claim 1, wherein the set of changes is identified from operational constraints for the aircraft.

11. The apparatus of claim 3, wherein the position of the aircraft comprises a location of the aircraft in three-dimensional space and an orientation of the aircraft.

12. The apparatus of claim 8, wherein the instruction analyzer determines whether the logical representation of the movement instruction fits an operating condition of the aircraft.

13. The apparatus of claim 1, wherein the movement instruction is at least one of: a verbal instruction, and a digital air traffic control instruction, for the aircraft to change at least one of: a flight path, and an airspeed.

14. A method for processing a movement instruction for an aircraft, the method comprising: receiving, in an instruction analyzer, the movement instruction for the aircraft, wherein the aircraft receives the movement instruction during a movement of the aircraft; generating in real time, using the movement instruction converted into a logical expression; a reasoning system that generates a set of changes to the logical expression, a number of volumes of airspace defining a desired flight path for the aircraft; and displaying the number of volumes of airspace defining the desired flight path for the aircraft on a display device.

15. The method of claim 14, wherein the movement instruction is a verbal instruction and wherein generating the number of volumes of airspace defining the desired flight path for the aircraft using the movement instruction during the movement of the aircraft comprises:

converting the verbal instruction into text;
converting the text into a logical representation of the verbal instruction; and
generating the number of volumes of airspace defining the desired flight path for the aircraft using the logical representation of the verbal instruction.

16. The method of claim 14 further comprising:
generating a route for the aircraft using the number of volumes of airspace.

17. The method of claim 14, wherein the movement instruction is at least one of: a verbal instruction, and a digital air traffic control instruction, for the aircraft to change at least one of: a flight path, and an airspeed.

18. The method of claim 14, wherein the movement instruction is an air traffic management instruction.

* * * * *